(12) United States Patent
Shibui et al.

(10) Patent No.: US 7,594,457 B2
(45) Date of Patent: Sep. 29, 2009

(54) METHOD OF MACHINING WORK IN NUMERICALLY CONTROLLED LATHE

(75) Inventors: Yutaka Shibui, Kitasaku-gun (JP);
Hajime Matsumaru, Kitasaku-gun (JP);
Keita Kazuie, Kitasaku-gun (JP)

(73) Assignee: Citizen Holdings Co., Ltd., Nishitokyo-shi, Tokyo (JP)

( * ) Notice: Subject to any disclaimer, the term of this patent is extended or adjusted under 35 U.S.C. 154(b) by 190 days.

(21) Appl. No.: 10/594,030

(22) PCT Filed: Apr. 12, 2005

(86) PCT No.: PCT/JP2005/007047

§ 371 (c)(1),
(2), (4) Date: Sep. 25, 2006

(87) PCT Pub. No.: WO2005/102570

PCT Pub. Date: Nov. 3, 2005

(65) Prior Publication Data

US 2007/0186735 A1  Aug. 16, 2007

(30) Foreign Application Priority Data

Apr. 19, 2004  (JP) .............................. 2004-123222

(51) Int. Cl.
*B23B 13/04* (2006.01)
*B23B 3/30* (2006.01)

(52) U.S. Cl. .............................. 82/1.11; 82/129; 82/118

(58) Field of Classification Search .................. 82/1.11, 82/118, 122, 123, 129; 700/159, 160, 169, 700/177, 178
See application file for complete search history.

(56) References Cited

U.S. PATENT DOCUMENTS

| | | | | |
|---|---|---|---|---|
| 6,311,098 | B1 * | 10/2001 | Higasayama et al. | 700/159 |
| 6,754,555 | B2 * | 6/2004 | Yamato | 700/178 |
| 7,249,545 | B2 * | 7/2007 | Shinohara et al. | 82/1.11 |
| 2005/0217441 | A1 * | 10/2005 | Shinohara et al. | 82/1.11 |

FOREIGN PATENT DOCUMENTS

| | | | |
|---|---|---|---|
| JP | 06047603 A | * | 2/1994 |
| JP | 2001-018101 | | 1/2001 |
| JP | 2002-341913 | | 11/2002 |
| JP | 2002-341915 | | 11/2002 |
| WO | WO02/24385 A1 | | 3/2002 |

* cited by examiner

*Primary Examiner*—Boyer D Ashley
*Assistant Examiner*—Sara Addisu
(74) *Attorney, Agent, or Firm*—Manabu Kanesaka (57) ABSTRACT

In a method of machining a work in a numerically controlled lathe, it is possible to reduce machining cost by shortening idle time at the time of switching and to enhance the lifetime by lessening a load on a feeding mechanism of a tool rest. After completion of the machining of a work W with a tool T1 on one tool rest (13), the one tool rest (13) is moved to a standby position B and, at the same time, the other tool rest (15) is moved from a standby position D and the feed speed of the other tool rest (15) is controlled such that the one and the other tool rests (13, 15) simultaneously reach positions C and F preset between the work W and the standby positions B and D.

7 Claims, 9 Drawing Sheets

METHOD OF MACHINING WORK IN NUMERICALLY CONTROLLED LATHE

TECHNICAL FIELD

The present invention relates to a method of machining a work in a numerically controlled lathe in which the work gripped by a chuck of a rotatable spindle is machined with tools installed on a plurality of tool rests.

BACKGROUND ART

A numerically controlled lathe (hereinafter written as a NC lathe) has been known which machines a work gripped by a chuck of a rotatable spindle while switching tools installed on a plurality of tool rests.

One such NC lathe has a first tool rest moving back and forth in an axis line direction traversing the axis line of the spindle, and a second tool rest provided opposite to the spindle and moving back and forth on the axis line of the spindle, wherein the outer peripheral surface of the work is mainly machined with tools installed on the first tool rest, while the end face of the work is mainly machined with tools installed on the second tool rest.

Figure 8:
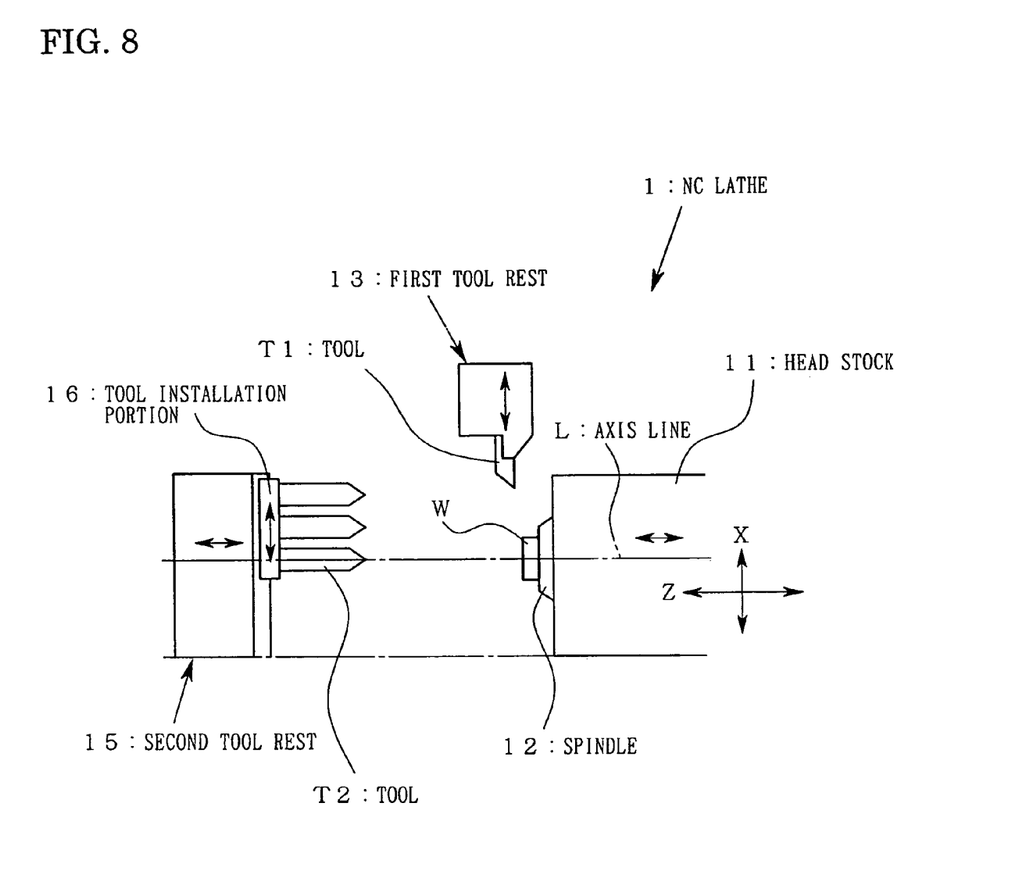
FIG. 8 shows one example of a NC lathe to which the present invention can be applied, wherein the configuration of main parts of the NC lathe is shown in a schematic view.

FIG. 8 shows one example of the NC lathe described above, wherein the configuration of main parts of the NC lathe is shown in a schematic view.

A NC lathe 1 has a head stock 11 rotatably supporting a spindle 12 and capable of moving back and forth in a Z direction which is in the same direction as an axis line L of the-spindle 12, a comb-teeth-shaped first tool rest 13 disposed on one side of the axis line L of the spindle 12, and a comb-teeth-shaped second tool rest 15 disposed opposite to the spindle 12 on the axis line L.

The first tool rest 13 is movable in a Y direction perpendicular to the surface of the drawing of FIG. 8, and in an X direction perpendicular to both the Z and Y directions. Moreover, the second tool rest 15 can move back and forth in the Z direction.

A plurality of tools T1 such as cutting tools is arranged in the Y direction and installed on a tool installation portion of the first tool rest 13. Moreover, the second tool rest 15 is provided with a tool installation portion 16 movable in the X direction on which a plurality of (three in the example shown in the drawing). tools T2 such as drills or end mills for, for example, drilling in an end face of a work W is arranged and installed. Further, the tools T1 mainly machine the outer peripheral surface of the work W, while the tools T2 mainly machine the end face of the work W.

A through-hole is formed in the spindle 12 on the axis line L, and the long rod-like work W is inserted through this through-hole. The work W is gripped by an unshown chuck at the tip of the spindle so that a predetermined length of the tip of the work W protrudes from the front end of the spindle 12. The first tool rest 13 moves in the Y direction to index the predetermined tool T1 to a machining position. Then, by a combination of the movement of the first tool rest 13 in the X direction and the movement of a head stock 31 in the Z direction, the tool T1 is positioned relative to the work W and the work W is cut by the tool T1.

The second tool rest 15. indexes the predetermined tool T2 to a machining position (on the spindle axis line L) by the movement of the tool installation portion 16 in the X direction, and the second tool rest 15 moves in the Z direction to position the tools T2 relative to the work W, thereby machining the end face of the work W with the tools T2.

Figure 9A:
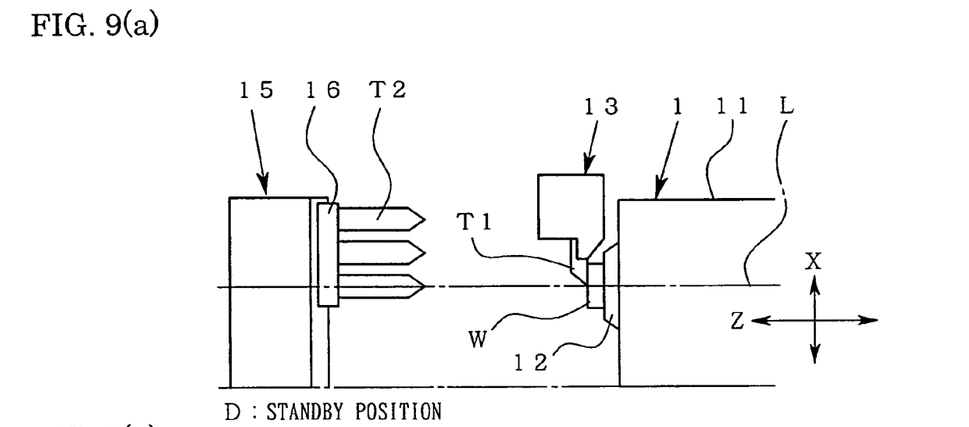
FIG. 9 are diagrams explaining a tool switching procedure in the NC lathe of FIG. 8 according to a conventional example of the present invention.
Figure 9B:
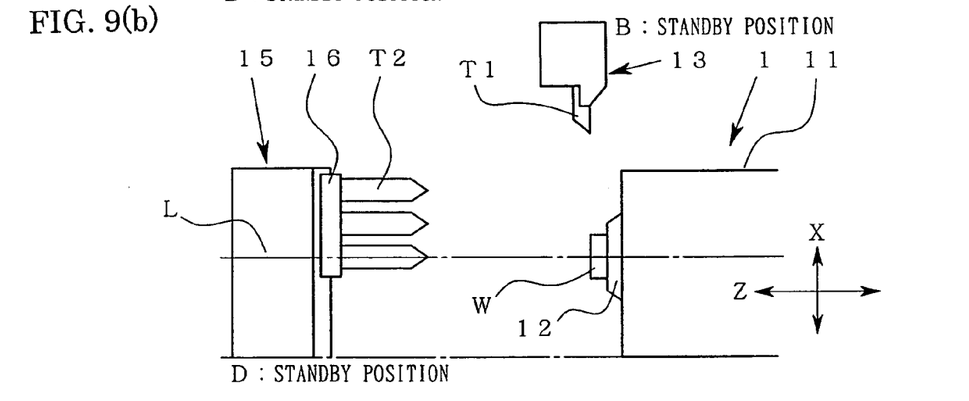
Figure 9C:
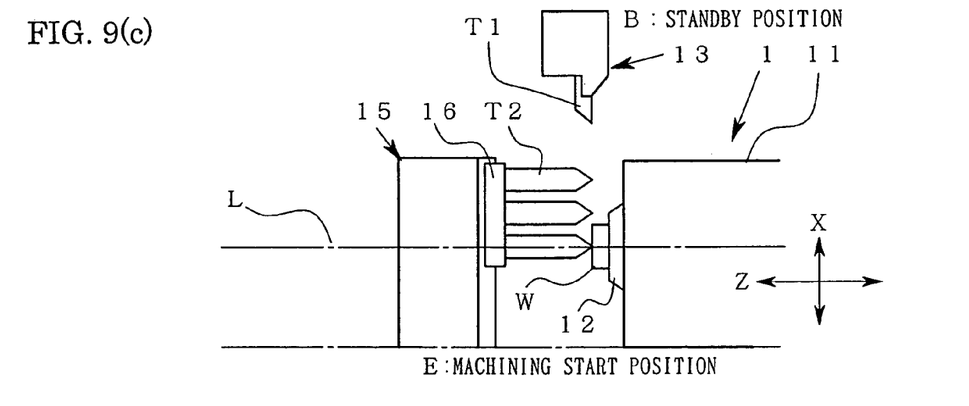

In the NC lathe 1 having the configuration described above, the second tool rest 15 is on standby at a standby position D sufficiently away from the area for machining the work W during the machining of the work W with the tool T1 installed on the first tool rest 13, as shown. in FIG. 9(a). When the end face of the work W is machined with the tool T2 installed on the second tool rest 15 after the outer peripheral surface of the work W has been machined, the first tool rest 13 is moved back to a standby position B sufficiently away from the area for machining the work W as shown in FIG. 9(b), and then the second tool rest 15 is moved from the standby position D to a machining start position E for starting the machining of the work W, as shown in FIG. 9(c).

On the other hand, recently, because of a desire for a further reduction in work machining costs, measures have been taken to reduce machining time by, for example, reducing the time for indexing the tools by the tool rest and increasing the rotation speed of the spindle. However, the limit has been substantially reached in recent years in the reduction of the machining time achieved by the reduction of the index time and the increase of the rotation speed of the spindle, such that a further considerable reduction in the machining time can hardly be expected.

Therefore, the applicant of the present application has proposed a method of machining a work which reduces the time for switching the tools when machining the work while switching the tools of a plurality of tool rests, such that the machining time can be reduced and the machining costs of the work can be further reduced (refer to Patent documents 1 and 2).

Patent document 1: Japanese Patent Publication Laid-open No. 2002-341913

Patent document 2: Japanese Patent Publication Laid-open No. 2002-341915

DISCLOSURE OF THE INVENTION

In the technique described in the above documents, of the tools of the two tool rests disposed opposite to each other on both sides of the spindle axis line, the cutting edges of the tools which perform the machining next time are put on standby at a position as close to the work as possible, such that the work can be continuously machined while both tools are being quickly switched to the extent that they do not interfere with each other.

Thus, the technique described in the above documents is useful for a NC lathe having two opposite comb-teeth-shaped tool rests on both sides of the spindle axis line, but this technique can not be applied as is to a form of a NC lathe having a plurality of tool rests arranged in the positional relation described above wherein while the machining is being carried out with the tools of the one rest, the other tool rest is put on standby at the standby position.

Furthermore, in this type of NC lathe, the tool rests are moved back and forth between the standby position and the work at a fast feed speed, and there is a problem that if the tool rest is moved at the fast feed speed, a heavy load is repeatedly exerted on a feed mechanism of the tool rest, resulting in a shortened lives of shafts of screws and the like constituting the feed mechanism.

The present invention has been made in view of the foregoing problems, and provides a method of machining a work in a numerically controlled lathe, wherein when the work is machined while switching between tools installed on a first and second tool rests in the NC lathe in which the two tool rests are arranged in a positional relation as described above, idle time during switching can be reduced to reduce the machining time of the work for a further reduction in the machining costs of the work, and the load on the feed mechanism due to fast feeding can be reduced to prolong the life of the feed mechanism.

In order to achieve the above object, after the completion of the machining of the work with the tools of one tool rest, the one tool rest is moved to the standby position, and at the same time, the other tool rest is moved from the standby position, and the feed speed of the other tool rest is controlled such that the one and the other tool rests may simultaneously reach positions preset between the work and the standby positions. Thus, it has been found out that the switching time can be considerably reduced.

To be specific, the present invention provides a method of machining a work in a numerically controlled lathe having a rotatable spindle, a first tool rest configured to move back and forth relative to the spindle in a spindle axis line direction and in a direction crossing a spindle axis line, and a second tool rest configured to move back and forth relative to the spindle in the spindle axis line direction, the method comprising the steps of: judging which of the first tool rest and the second tool rest tools used in current machining are installed on; judging whether tools used in next machining are the tools installed on the first tool rest or the tools installed on the second tool rest; judging whether interference is caused between the first tool rest and the second tool rest during movement when, as to the first tool rest and the second tool rest, the tool rest on which the tools used in the current machining are installed is different from the tool rest on which the tools used in the next machining are installed; obtaining, for both the first tool rest and the second tool rest, interference boundary positions at which the first tool rest and the second tool rest are in proximity but do not interfere with each other, on the movement paths of the respective tool rests, when interference is caused between the first tool rest and the second tool rest; moving one tool rest toward the standby position at a fast feed speed when the tool rest on which the tools used in the current machining are installed is different from the tool rest on which the tools used in the next machining are installed; obtaining a feed speed for the other tool rest so that the other tool rest on which the tools used in the next machining are installed reaches the interference boundary position within the same time as the time in which the one tool rest reaches the interference boundary position, and moving the other tool rest toward the interference boundary position at the obtained feed speed; and increasing the speed of the other tool rest to a fast feed speed when the other tool rest passes the interference boundary position so as to move the tools used in the next machining to a machining start position in the case where the feed speed obtained for the other tool rest is less than the fast feed speed.

According to this method, when one of the first tool rest and the second tool rest oh which the tools used in the current machining is installed is moved to the standby position at the fast feed speed, the first tool rest and the second tool rest pass, at the same time, the interference boundary position at which the first tool rest and the second tool rest are in proximity but do not interfere with each other, and the speed of the other tool rest is increased to the fast feed speed in conjunction with the passage through the interference boundary position. Thus, the tool other rest on which the tools used in the next machining are installed can reach the work at the minimum distance and minimum time.

The present invention is not limited to the case where a single tool is installed on the second tool rest, and is also applicable to the case where a plurality of tools is installed on the second tool rest. In this case, the plurality of tools may be arranged in the same direction as the movement direction of the first tool rest crossing the spindle axis line, and the plurality of tools may be moved in the same direction as the movement direction of the first tool rest to index a predetermined tool to the machining position.

The following is a specific method of obtaining the feed speed for the other tool rest so that the other tool rest on which the tools used in the next machining are installed may reach the interference boundary position within the same time as the time in which the one tool rest reaches the interference boundary position. A comparison is made between time in which the one tool rest reaches the interference boundary position and time in which the other tool rest reaches the interference boundary position when the other tool rest is moved at the fast feed speed. When the other tool rest reaches the interference boundary position in a shorter time than the one tool rest, the feed speed of the other tool rest can be obtained from the distance between the standby position and the interference boundary position of the other tool rest and from the time in which the one tool rest reaches the interference boundary position.

To make it possible to judge whether or not interference is caused and determine an interference occurring position serving as a reference for setting the interference boundary position, a first interference check area is formed for the first tool rest from a predetermined part of the first tool rest which can cause interference with the second tool rest and from the position of the cutting edges of the tools installed on the first tool rest and indexed to the machining position, thus checking whether interference is caused between the first interference check area and the second tool rest.

When the cutting edges of the tools installed on the second tool rest are aligned at the same position, a second interference check area can be formed for the second tool rest from the position of the cutting edges of the tools and the diameter of the tools. When the tools installed on the second tool rest are tools of different lengths and the position of the cutting edges thereof is irregular, the second interference check areas can be formed for the respective tools from the position of the cutting edges thereof, the diameter of the tools, and the positions at which the tools are installed on the second tool rest, and then whether or not interference is caused can be judged from the positional relation between each of the interference check areas and the first interference check area.

The present invention provides the configuration as described above wherein a numerically controlled lathe comprises a rotatable spindle, a first tool rest configured to move back and forth relative to the spindle in a spindle axis line direction and in a direction crossing a spindle axis line, and a second tool rest configured to move back and forth relative to the spindle in the spindle axis line direction. Thus, in this numerically controlled lathe, when a work is machined while switching between tools installed on the first tool rest and tools installed on the second tool rest, it is possible to reduce the time for switching from the tools on one tool rest to the tools on the other tool rest, and to reduce the time for machining the work to reduce the machining costs.

Furthermore, the time for moving the tool rest at the fast feed speed can be reduced to reduce the load exerted on the feed mechanism, thereby prolonging the life of the feed mechanism.

BEST MODE FOR CARRYING OUT THE INVENTION

Hereinafter, preferred embodiments of the present invention will be described in detail with reference to the drawings.

First Embodiment

Figure 1:
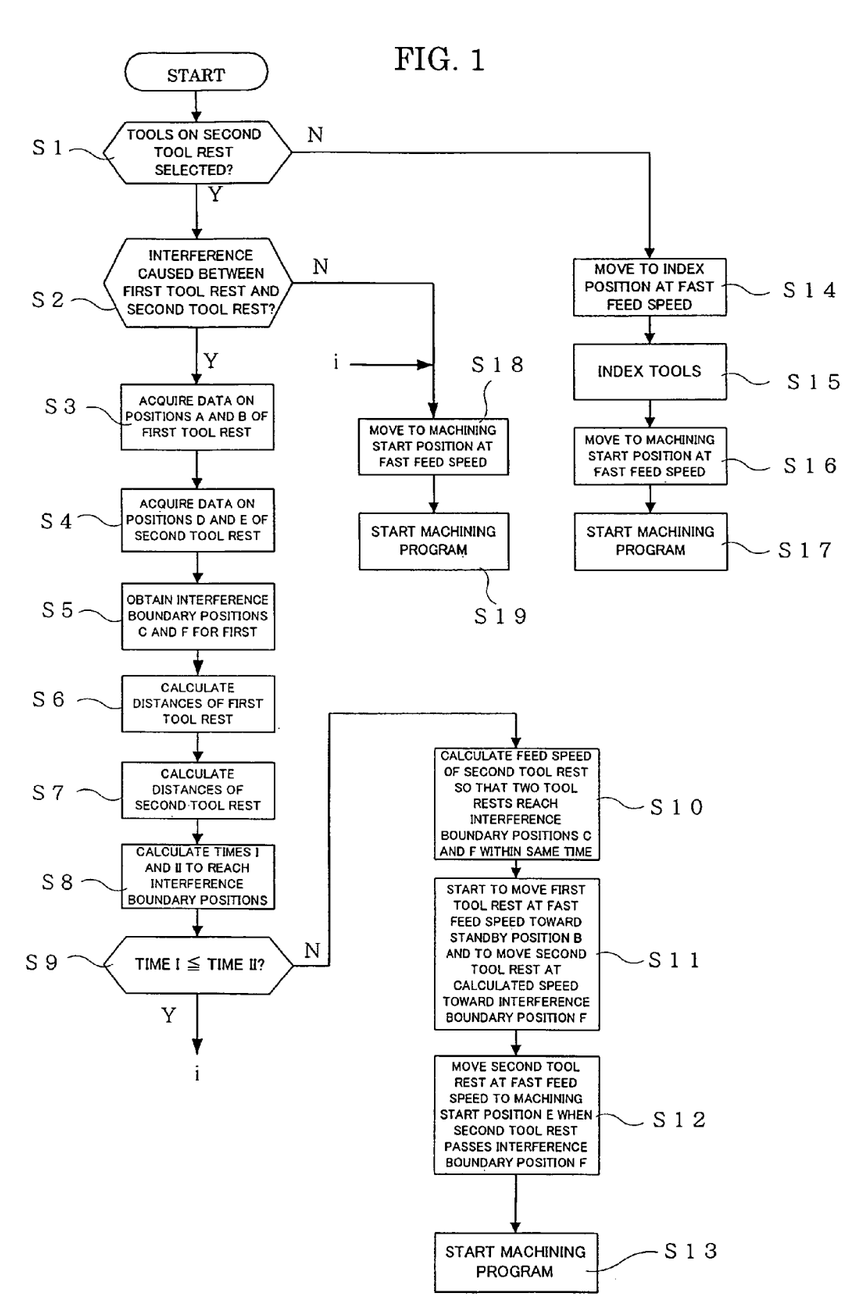
FIG. 1 is a flowchart explaining a tool switching procedure according to a first embodiment of a machining method of the present invention.
Figure 2:
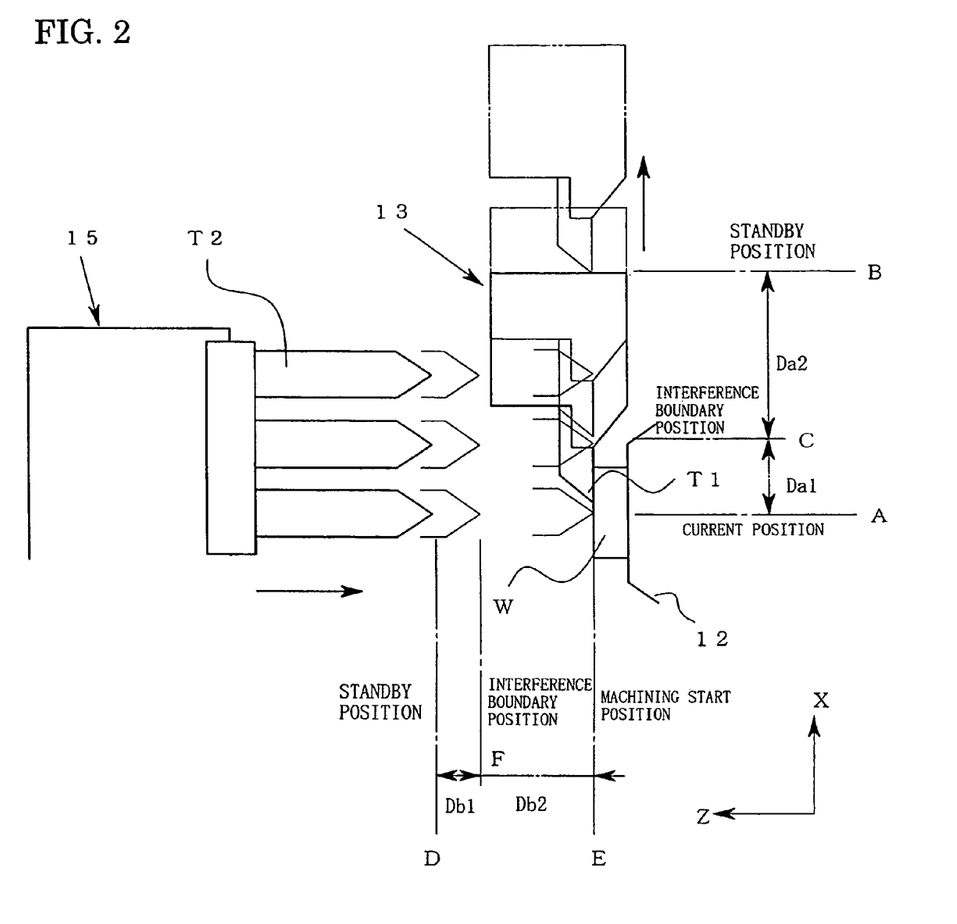
FIG. 2 is a diagram explaining the positional relation between two tool rests in this embodiment.
Figure 3:
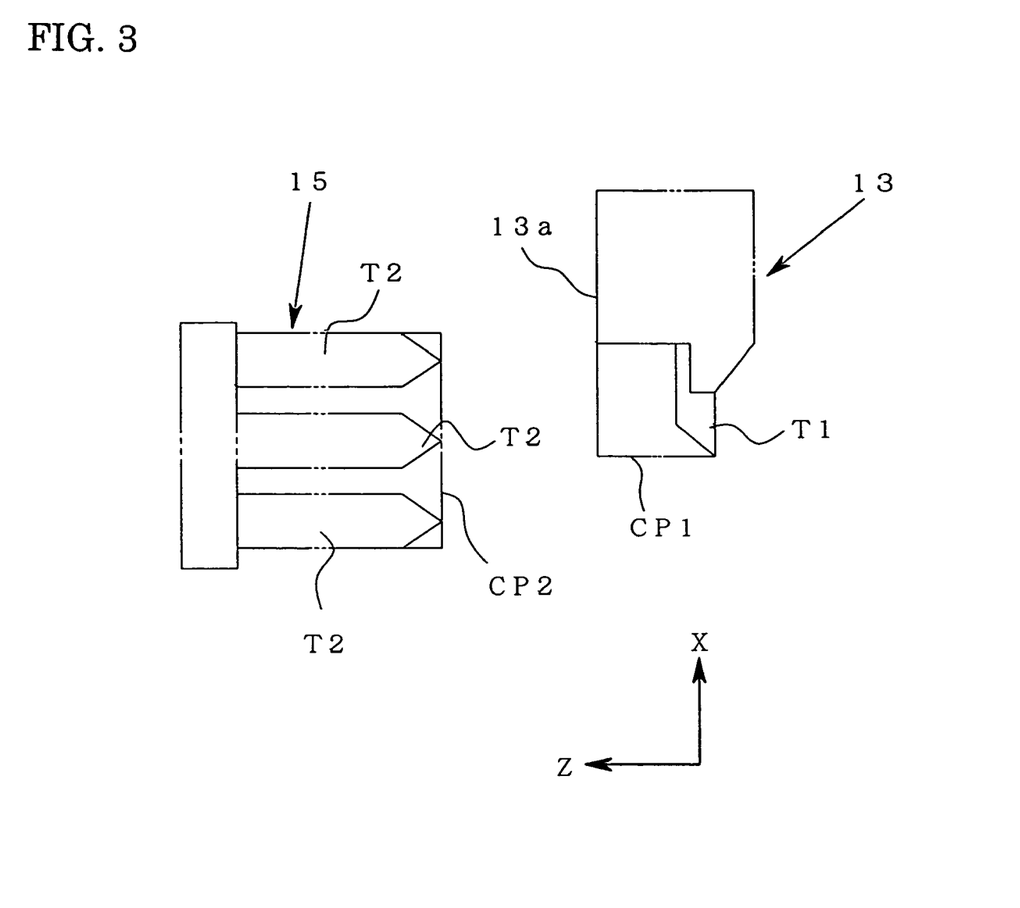
FIG. 3 is a diagram explaining one approach for interference judgment in this embodiment.
Figure 4A:
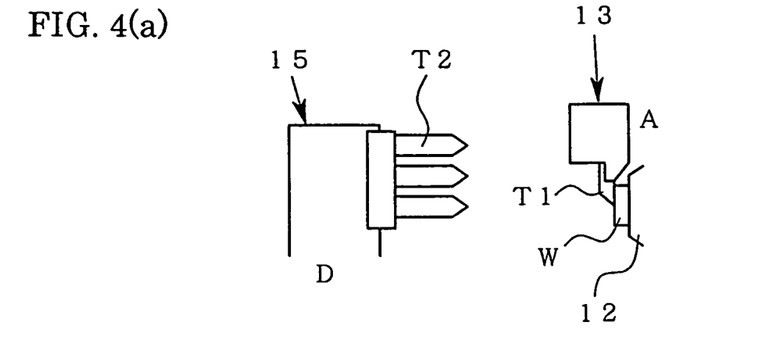
FIG. 4 are diagrams explaining the positional relation between the first and second tool rests when the machining with the tools of the first tool rest is terminated, when both tool rests have reached interference boundary positions, and when the tools of the second tool rest have reached a machining start position.
Figure 4B:
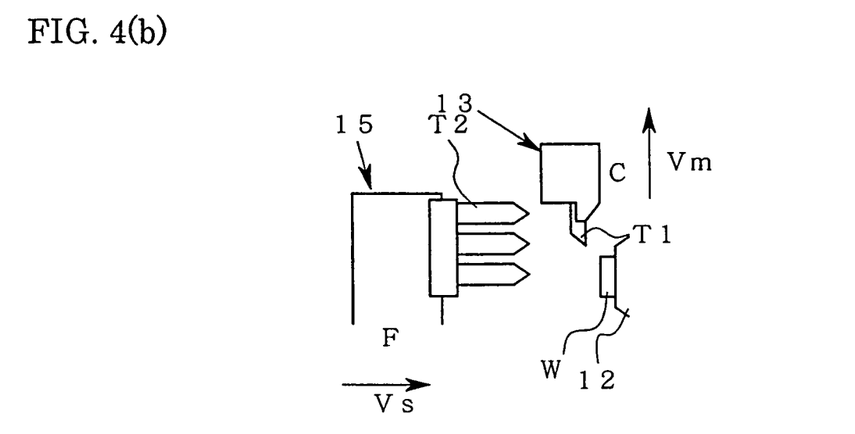
Figure 4C:
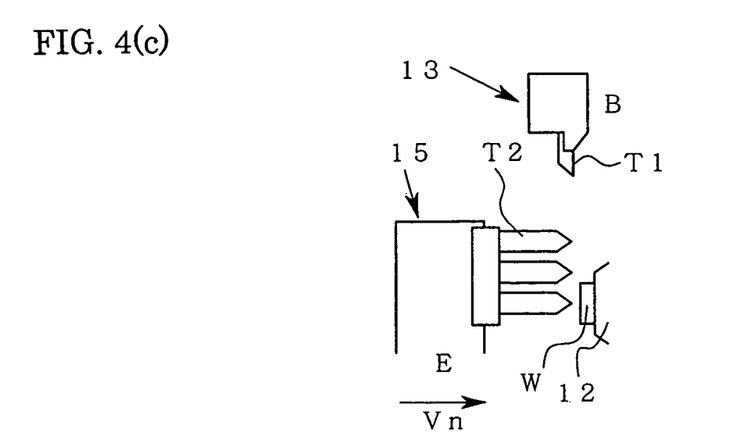

FIG. 1 is a flowchart explaining a tool switching procedure according to a first embodiment of the present invention. FIG. 2 is a diagram explaining the positional relation between two tool rests in this embodiment. FIG. 3 is a diagram explaining one approach for interference judgment in this embodiment. FIGS. 4 are diagrams showing the positional relation between the first and second tool rests at stages when the machining with tools of the first tool rest is terminated, when both of the tool rests have reached interference boundary positions, and when tools of the second tool rest have reached a machining start position.

It is to be noted that a NC lathe in this embodiment has the same basic configuration as that of a NC lathe shown in FIGS. 8 and 9, and the same parts and members as those in FIGS. 8 and 9 are given the same numerals and are not described in detail.

Before starting the machining of a work W, a standby position B for a first tool rest 13 and a standby position D for a second tool rest 15 are set, as shown in FIG. 2. The standby position B, D is a position at which while the work W is being machined with tools (e.g., tools T1) installed on one tool rest (e.g., the first tool rest 13), the other tool rest (e.g., the second tool rest. 15) is on standby. This position is preset to a position sufficiently backward from a machining area in which the work W is machined.

The tool switching procedure in the present invention will be described below. However, the following description is given on the assumption that the tools are switched after the work W is machined with the tools T1 installed on the first tool rest 13 so as to continue the machining of the work W. Moreover, in this embodiment, all tools T2 installed on the second tool rest have the same length, and the cutting edges of the tools T2 are aligned on the same straight line.

As indicated by full lines in FIG. 2 and as shown in FIG. 4(a), the second tool rest 15 is on standby at the standby position D while the work W is being machined with the tools T1 of the first tool rest 13.

After the termination of the machining with the tools T1 by which the current machining has been carried out (sometimes written as current machining tools), an unshown controller of the NC lathe judges from a machining program for the work W whether tools used in the next machining (sometimes written as next machining tools) are the tools T1 installed on the first tool rest 13 or the tools T2 installed on the second tool rest 15 (step S1).

When the tools T1 installed on the first tool rest 13 are used as the next machining tools, the first tool rest 13 is moved at a fast feed speed to a position where the tools T1 can be indexed, for example, to the standby position B (step S14). At this position B, the next machining tools T1 are indexed (step S15). After the index, the first tool rest 13 is moved at the fast feed speed toward the work W, and the next machining tools T1 are moved to the machining start position for the work W (step S16). Then, the machining program for machining the work W with the next machining tools T1 is started (step S17).

When the tools T2 of the second tool rest 15 are used as the next machining tools, the controller judges whether interference is caused between the first tool rest 13 and the second tool rest 15 (step S2).

As to whether or not interference is caused, a judgment may be made in the following manner. For example, as shown in FIG. 3, areas (interference check areas) CP1 and CP2 are set for the first tool rest 13 and the second tool rest 15 to detect interference between the tool rests 13 and 15, and the areas CP1 and CP2 are moved together with the movement of the tool rests 13 and 15 to see whether or not interference is caused between the areas CP1 and CP2.

The interference check area CP1 for the first tool rest 13 can be formed from data on the position in a Z direction of a front surface 13a (XY surface) of the first tool rest 13 which can cause interference with the tools T2 installed on the second tool rest 15, and from data on the cutting edge position obtained from the tool length of the current machining tool T1 installed on the tool rest 13.

The interference check area CP2 for the second tool rest 15 can be formed from data on the cutting edge position of each of the plurality of tools T2 installed on the second tool rest 15 and from tool diameter data.

Then, a track of the interference check area CP1 when the first tool rest 13 is moved at the fast feed speed from a current position A to the standby position B is obtained, and a track of the interference check area CP2 when the second tool rest 15 is moved at the fast feed speed from the standby position D to a machining start position E is obtained, thus judging whether or not interference is caused between these areas CP1 and CP2 during movement.

Consequently, when interference is not caused between the first tool rest 13 and the second tool rest 15, the first tool rest 13 is moved at the fast feed speed from the current position A to the standby position B, and the second tool rest 15 is moved at the fast feed speed from the standby position D to the machining start position E (step S18). Then, the machining program for machining the work W with the next machining tools T2 is started (step S19).

When it has been judged in step S2 that interference is caused, there are acquired coordinate data for the standby positions B and D of the tool rests 13 and 15, coordinate data for the current position A of the first tool rest 13, and coordinate data for the machining start position E of the next machining tools T2 (steps S3 and S4).

Next, positions (interference boundary positions) C and F are acquired which are set on movement paths of the first tool rest 13 and the second tool rest 15 and which serve as boundaries where interference between the tool rests 13 and 15 is caused or not caused (step S5).

The interference boundary positions C and F can be decided, for example, in the following procedure.

First, positions are obtained where the interference check areas CP1 and CP2 of the tool rests 13 and 15 initially cause interference in the process of movement. Then, the interference boundary positions C and F where the interference check areas CP1 and CP2 do not cause interference are set at a place closer to the standby position B of the first tool rest 13 and a place closer to the standby position D of the second tool rest 15 from the above initial interference positions. The distances from the initial interference positions to the interference boundary positions C and F can be arbitrarily set, and is preferably about 0.5 millimeters to several millimeters.

The interference boundary positions C and F are thus set, and coordinate data for these positions are obtained (step S5).

Next, from the acquired coordinate data, a distance Da1 between the adjacent positions A and C, a distance Da2 between the adjacent positions C and B, a distance Db1 between the adjacent positions D and F, and a distance Db2 between the adjacent positions F and E are calculated for the first tool rest 13 and the second tool rest 15 (steps S6 and S7).

In order for the next machining tools T2 of the second tool rest 15 to reach the machining start position E from the standby position D at the minimum time, the second tool rest 15 is to reach the interference boundary position F from the standby position D within the same time as the time in which the first tool rest 13 has reached the interference boundary position C from the current position A, such that the next machining tools T2 is moved at the fast feed speed from the interference boundary position F to the machining start position E.

In this embodiment, there are calculated time I in which the first tool rest 13 is moved at the fast feed speed from the current position A where it is located at the end of machining to the interference boundary position C, and time II required when the second tool rest 15 is moved at the fast feed speed from the standby position D to the interference boundary position F (step S7). Then, the time I is compared with the time II (step S8).

FIGS. 5 are graphs showing the relation between the feed speed and time of the first tool rest 13 and the second tool rest 15.

Figure 5A:
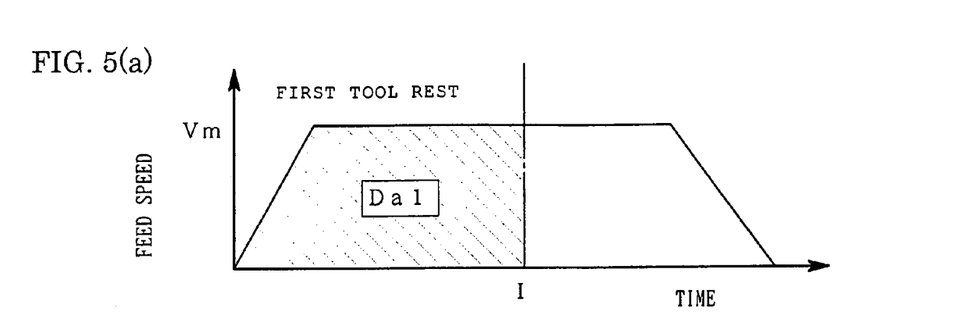
FIG. 5 are graphs showing the relation between the feed speed and time of a first tool rest 13 and a second tool rest 15.

In FIG. 5(a), the area of a shaded part corresponds to the distance Da1 between the current position A and the interference boundary position C when the first tool rest 13 is moved at a fast feed speed Vm. In the same manner, in FIG. 5(b), the area of a shaded part corresponds to the distance Db1 between the standby position D and the interference boundary position F when the second tool rest 15 is moved at a fast feed speed Vn.

Figure 5B:
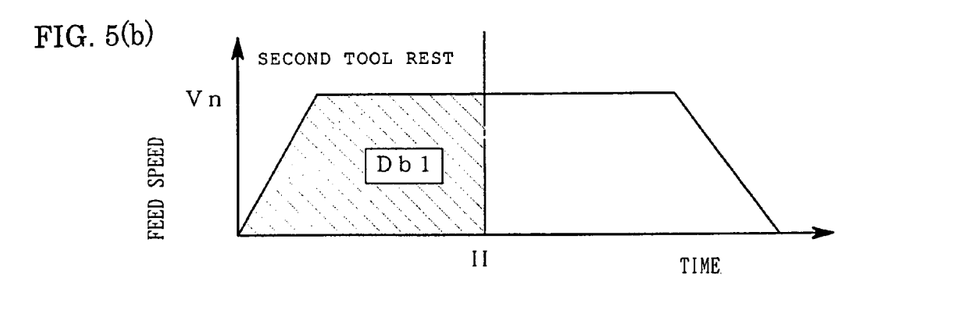

In the case where the time I is longer than the time II, that is, in the case as shown in FIG. 5(b), the second tool rest 15 passes the interference boundary position F before the first tool rest 13 reaches the interference boundary position C, and a feed speed Vs of the second tool rest 15 is therefore obtained so that the time at which the first tool rest 13 passes the interference boundary position C may be the same as the time at which the second tool rest 15 passes the interference boundary position F (step S10). That is, as shown in FIG. 5(c), the feed speed Vs is obtained so that the area of the shaded part may be equal to the distance Db1 when a time axis is fixed at such a position that the time II equals to the time I.

Then, the first tool rest 13 is moved toward the standby position B at the fast feed speed Vm, and the second tool rest 15 is moved toward the interference boundary position F at the feed speed Vs obtained in step S10 (step S11).

In this manner, as shown in FIG. 4(b), the first tool rest 13 and the second tool rest 15 reach their interference boundary positions C and F within the same time. The second tool rest 15 is moved at the feed speed Vs less than the fast feed speed Vn until it reaches the interference boundary position F, so that, during this time, a load exerted on a feed mechanism, for example, on shafts of screws and the like can be reduced.

Figure 5C:
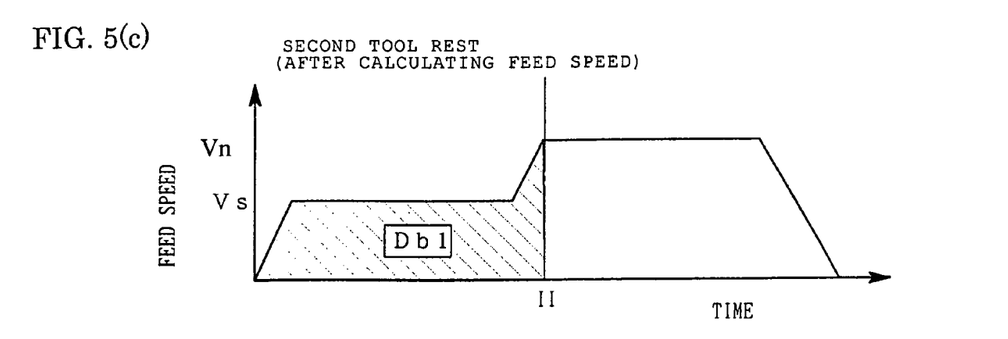

After the second tool rest 15 has reached the interference boundary position F, the speed of the second tool rest 15 is increased to the fast feed speed Vn, and the second tool rest 15 is moved to the machining start position E, as shown in FIGS. 4(c) and 5(c) (step S12).

When the second tool rest 15 has reached the machining start position E, the machining program for machining the work W is then started, thereby starting the machining of the work W (step S13).

In addition, when the time I is shorter than the time II or when the time I is the same as the time II, no interference is caused between the tool rests 13 and 15, so that both the first tool rest 13 and the second tool rest 15 are moved at the fast feed speeds Vm and Vn (step S18). After the second tool rest 15 has reached the machining start position E, the machining program for machining the work W with the next machining tools T2 is started (step S19).

Second Embodiment

Next, a second embodiment will be described referring to a flowchart of FIG. 6 and to FIG. 7 wherein a plurality of (four in the example shown in the drawing) tools installed on a second tool rest 15 are tools T21 to T24 of different lengths.

It is to be noted that this embodiment is the same as the first embodiment except that a procedure of setting interference boundary positions C and F is different from the procedure described above. Therefore, the procedure of setting the interference boundary positions C and F will be described below in detail, and the same parts as those in the first embodiment are not described. Moreover, for convenience, the following description is given on the assumption that after a work W has been machined with tools T1 of a first tool rest 13, the tool T24 installed on a lowermost step, among the tools T21 to T24 of the second tool rest 15, is selected as a next machining tool.

Figure 6:
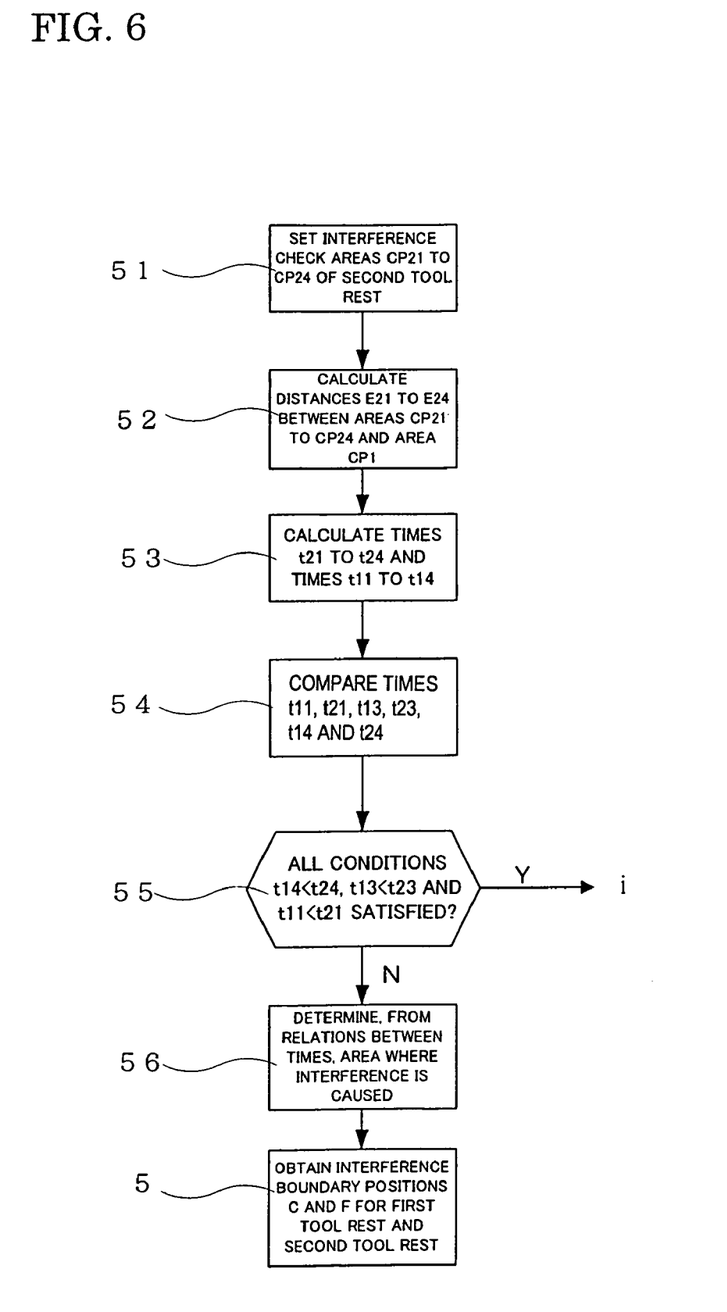
FIG. 6 is a flowchart explaining a tool switching procedure according to a second embodiment of the machining method of the present invention.
Figure 7A:
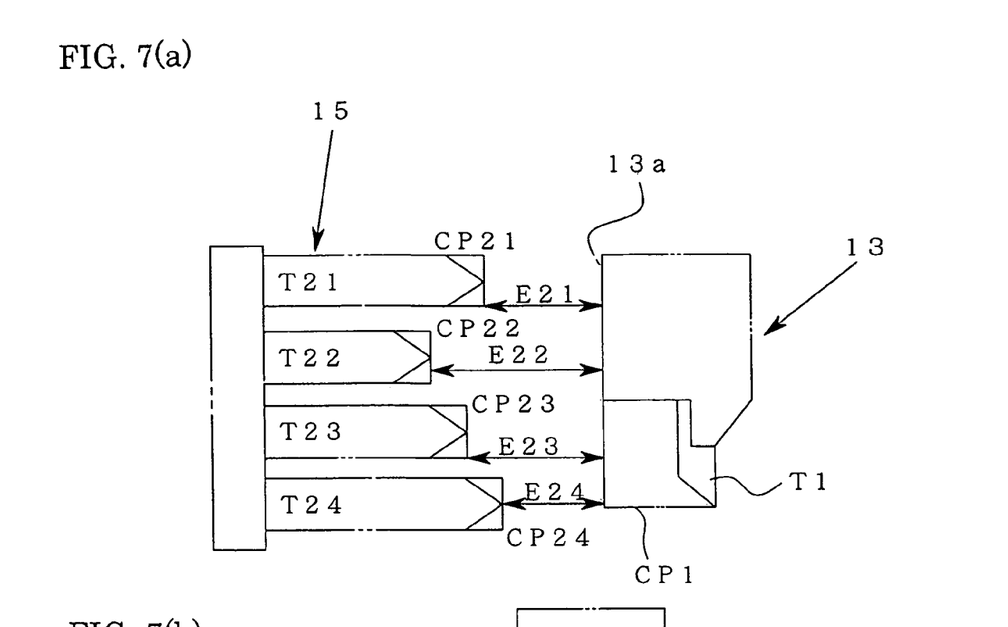
FIG. 7 are diagrams explaining one approach for interference judgment in this embodiment.
Figure 7B:
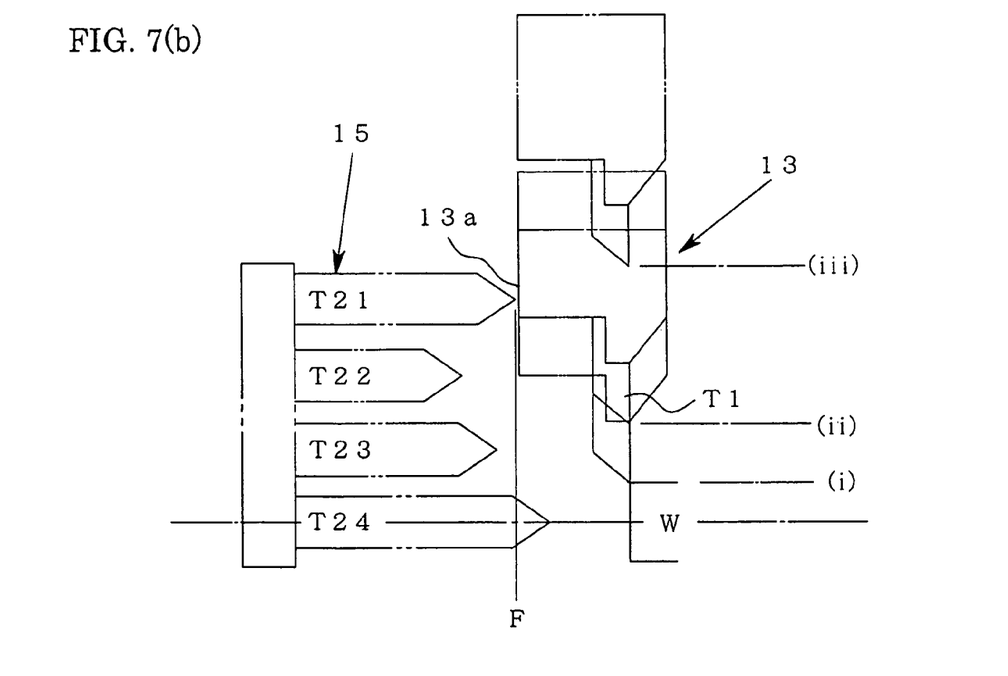

FIG. 6 is a flowchart explaining the procedure of setting the interference boundary positions C and F. FIG. 7(a) is a diagram showing the positional relation between the tools T21 to T24 of the second tool rest 15 and the first tool rest 13. FIG. 7(b) is a diagram explaining the relation between a movement path of the first tool rest 13 and the tools T21 to T24 of the second tool rest 15 in setting the interference boundary positions C and F.

In this embodiment, interference check areas CP21, CP22, CP23 and CP24 are set for the tools T21, T22, T23 and T24, respectively (step S51). The interference check areas CP21, CP22, CP23 and CP24 can be formed from tool diameter data for the tools T21, T22, T23 and T24, cutting edge position data, and installation position data for the tools T21, T22, T23 and T24 in the second tool rest 15.

Furthermore, distances E21, E22, E23 and E24 between the interference check areas CP21 to CP24 and an interference check area CP1 of the first tool rest 13 are obtained (step S52). Then, times t21, t22, t23 and t24 are calculated in which the interference check areas CP21 to CP24 reach the interference check area CP1 when the second tool rest 15 is moved to the side of the work W at a fast feed speed (step S53). In addition, in the example of tool installation shown in the drawings, because there is actually no possibility that the second tool T22 from the top causes interference with the first tool rest 13, the data (E22, t22) on the tool T22 may be previously excluded.

Next, there are time t14 in which the interference check area CP1 of the first tool rest 13 is moved from a current position A to a position (i) where it no longer causes interference with the next machining tool T24, time t13 in which the first tool rest 13 is moved to a position (ii) where it no longer causes interference with the tool T23, and time t11 in which the first tool rest 13 is moved to a position (iii) where it no longer causes interference with the tool T21 (step S53). Then, comparisons are made between the time t11 and the time t21, between the time t13 and the time t23 and between the time t14 and the time t24 (step S54).

Consequently, when all conditions t14<t24, t13<t23 and t11<t21 are satisfied (step S55), the interference check areas CP21, CP22 and CP24 of the second tool rest 15 reach the positions (i), (ii) and (iii) after the interference check area CP1 of the first tool rest 13 has passed the positions (i), (ii) and (iii), so that no interference is caused between the first tool rest 13 and the second tool rest 15. Therefore, the controller judges that no interference is caused between the first tool rest 13 and the second tool rest 15, and sends both the tool rests 13 and 15 at the fast feed speed to a standby position B and a machining start position A (refer to step S18, FIG. 1).

Under a condition other than those described above, that is, when any one of the conditions t14≧t24, t13≧t23 and t11≧t21 is included, it is judged that interference is caused between the first tool rest 13 and the second tool rest 15. In this case, the speed of the second tool rest 15 is adjusted so that the second tool rest 15 can be sent to the machining start position at the minimum time in such a manner as to avoid the interference.

In this case, where the interference is caused is judged in accordance with which condition corresponds among t14≧t24, t13≧t23 and t11≧t21 and in accordance with what kind of condition the other one or two are (step S56).

For example, when t13≧t23, t11≧t21 and t14<t24, it is considered that interference is caused between the interference check areas CP23 and CP1, and between the areas CP21 and CP1. Thus, the controller compares their time differences t13-t23 and t11-t21, and judges which first causes interference with the interference check area CP1. Then, when t13-t23>t11-t21, it is judged that the area CP21 and the area CP1 first cause interference. In a contrary case, it is judged that the interference between the area CP23 and the area CP1 is first caused.

Once where the interference is caused is decided as described above, the interference boundary positions C and F are set in accordance with this decision (step S5).

Subsequently, the procedure after step S6 is executed in the flowchart of FIG. 1.

While the preferred embodiments of the present invention have been described, the present invention is not at all limited to the embodiments described above.

For example, the present invention can also be applied whether the number of tools T1, T2 installed on the first, second tool rest 13, 15 is one or more. Moreover, the lengths of a plurality of tools T1, T2 and the positions of the cutting edges when installed on the first tool rest 13 and the second tool rest 15 may be the same or different.

Moreover, a plurality of tools T2 is installed on the second tool rest 15 in the X direction in the above description, but the present invention is also applicable when a plurality of tools T2 is installed in the Y direction.

INDUSTRIAL APPLICABILITY

The present invention is not limited to a numerically controlled lathe having two tool rests, and is also applicable to a numerically controlled lathe having three or more tool rests, for example, to a numerically controlled lathe having two or three tool rests on the periphery of a spindle axis line as long as it includes the form of arrangement as described above. Moreover, the form of the tool rest is not limited to a comb-teeth shape and may be a turret shape. Further, the present invention is not limited to a numerically controlled lathe of a head stock moving type in which a head stock moves, and is also applicable to a numerically controlled lathe of a head stock fixed type in which the head stock is fixed on a bed. Still further, a numerically controlled lathe may have a guide bush in front of a head stock so that the guide bush supports the tip of a work.

The invention claimed is:

1. A method of machining a work in a numerically controlled lathe having a rotatable spindle, a first tool rest configured to move back and forth relative to the spindle in a spindle axis line direction and in a direction crossing a spindle axis line, and a second tool rest configured to move back and forth relative to the spindle in the spindle axis line direction, the method comprising the steps of:
   judging which of the first tool rest and the second tool rest, tools used in current machining are installed on;
   judging whether tools used in next machining are the tools installed on the first tool rest or the tools installed on the second tool rest;
   judging whether interference is caused between the first tool rest and the second tool rest during movement when, as to the first tool rest and the second tool rest, the tool rest on which the tools used in the current machining are installed is different from the tool rest on which the tools used in the next machining are installed;
   obtaining, for both the first tool rest and the second tool rest, interference boundary positions at which the first tool rest and the second tool rest are in proximity but do not interfere with each other, on movement paths of the respective tool rests, when interference is caused between the first tool rest and the second tool rest;
   moving one tool rest toward a standby position at a fast feed speed when the tool rest on which the tools used in the current machining are installed is different from the tool rest on which the tools used in the next machining are installed;
   obtaining a feed speed for the other tool rest so that the other tool rest on which the tools used in the next machining are installed reaches the interference boundary position within a same time as a time in which the one tool rest reaches the interference boundary position, and moving the other tool rest toward the interference boundary position at an obtained feed speed; and
   increasing a speed of the other tool rest to a fast feed speed when the other tool rest passes the interference boundary position so as to move the tools used in the next machining to a machining start position in case where a feed speed obtained for the other tool rest is less than the fast feed speed.

2. The method of machining the work in the numerically controlled lathe according to claim 1, wherein when a plurality of tools is installed on the second tool rest, the plurality of tools is arranged in the same direction as the movement direction of the first tool rest crossing the spindle axis line, and the plurality of tools is moved in the same direction as the movement direction of the first tool rest to index a predetermined tool to the machining position.

3. The method of machining the work in the numerically controlled lathe according to claim 1, wherein a comparison is made between time in which the one tool rest reaches the interference boundary position when the one tool rest is moved at the fast feed speed and time in which the other tool rest reaches the interference boundary position when the other tool rest is moved at the fast feed speed; and when the other tool rest reaches the interference boundary position in a shorter time than the one tool rest, the feed speed of the other tool rest is obtained from a distance between the standby position and the interference boundary position of the other tool rest and from a time in which the one tool rest reaches the interference boundary position.

4. The method of machining the work in the numerically controlled lathe according to claim 1, wherein a first interference check area is formed for the first tool rest from a predetermined part of the first tool rest which can cause interference with the second tool rest and from a position of cutting edges of the tools installed on the first tool rest and indexed to a machining position; and a judgment is made as to whether or not the interference is caused between the first interference check area and the second tool rest and as to a position where the interference is caused.

5. The method of machining the work in the numerically controlled lathe according to claim 4, wherein when cutting edges of the tools installed on the second tool rest are aligned at a same position, a second interference check area is formed for the second tool rest from the position of the cutting edges of the tools and diameter of the tools.

6. The method of machining the work in the numerically controlled lathe according to claim 4, wherein when the tools installed on the second tool rest are tools of different lengths and position of the cutting edges thereof is irregular, the second interference check areas are formed for the respective tools from the position of the cutting edges thereof, diameters of the tools, and positions at which the tools are installed on the second tool rest, and judgments are made as to whether or not the interference is caused and as to a position where the interference is caused, from the positional relation between each of the interference check areas and the first interference check area.

7. The method of machining the work in the numerically controlled lathe according to claim 1, wherein a distance from each of the interference boundary positions to each of expected interference positions is in a range from 0.5 to several millimeters.

* * * * *